United States Patent [19]

Miyashita

[11] Patent Number: 5,116,117
[45] Date of Patent: May 26, 1992

[54] MULTISCREEN PROJECTOR APPARATUS

[75] Inventor: Yoshiaki Miyashita, Daito, Japan

[73] Assignee: Sanyo Electric Co., Ltd., Osaka, Japan

[21] Appl. No.: 706,832

[22] Filed: May 29, 1991

[30] Foreign Application Priority Data

May 30, 1990 [JP] Japan .............................. 2-56646[U]

[51] Int. Cl.⁵ ............................................ G03B 21/56
[52] U.S. Cl. ..................................... 353/94; 353/30; 353/37; 353/78; 359/460; 359/449
[58] Field of Search ..................... 353/94, 30, 37, 74, 353/77, 78, 122, 119; 350/123, 117, 127; 358/231, 60; 359/443, 460, 449

[56] References Cited

U.S. PATENT DOCUMENTS

| | | | |
|---|---|---|---|
| 3,909,525 | 9/1975 | Fagan | 353/30 |
| 3,981,573 | 9/1976 | Schwartz | 353/37 |
| 4,668,046 | 5/1987 | Yatabe et al. | 350/117 |
| 4,901,155 | 2/1990 | Hara et al. | 358/231 |
| 4,919,518 | 4/1990 | Ogino et al. | 353/94 |
| 5,011,277 | 4/1991 | Ogino et al. | 353/94 |

FOREIGN PATENT DOCUMENTS 50-32009 10/1975 Japan .
1-115778 8/1989 Japan .

Primary Examiner—William A. Cuchlinski, Jr.
Assistant Examiner—William C. Dowling
Attorney, Agent, or Firm—Armstrong, Nikaido, Marmelstein, Kubovcik & Murray

[57] ABSTRACT

A cabinet (2) providing one projector unit has a side wall formed with a projecting portion (21) accommodating a projector (1) therein, and another side wall opposed to the side wall and formed with a recessed portion (22) shaped in conformity with the shape of the projecting portion (21). One or a plurality of reflecting mirrors (4), (41) are arranged within the cabinet (2) for flexing an optical path (9) extending from the projector (1) to a screen (3). A plurality of such cabinets (2) are assembled into a multiscreen projector apparatus by engaging the projecting portion (21) of each cabinet (2) in the recessed portion (22) of another cabinet (2) adjacent thereto.

2 Claims, 9 Drawing Sheets

FIG. 9 PRIOR ART ic projector apparatus having a single large screen provided by a plurality of liquid crystal projectors or like image display units of the projector type in combination.

BACKGROUND OF THE INVENTION

Examined Japanese Patent Publication SHO 50-32009 discloses a method of projecting images on a multiplicity of display units. This method employs an enlarging device for enlarging one image source to project images on a large screen provided by the multiplicity of display units.

The enlarging device comprises, for example, frame memories corresponding in number to the number of display units, and reading of data from the frame memories is controlled to obtain images at a desired enlargement ratio.

Figure 8:
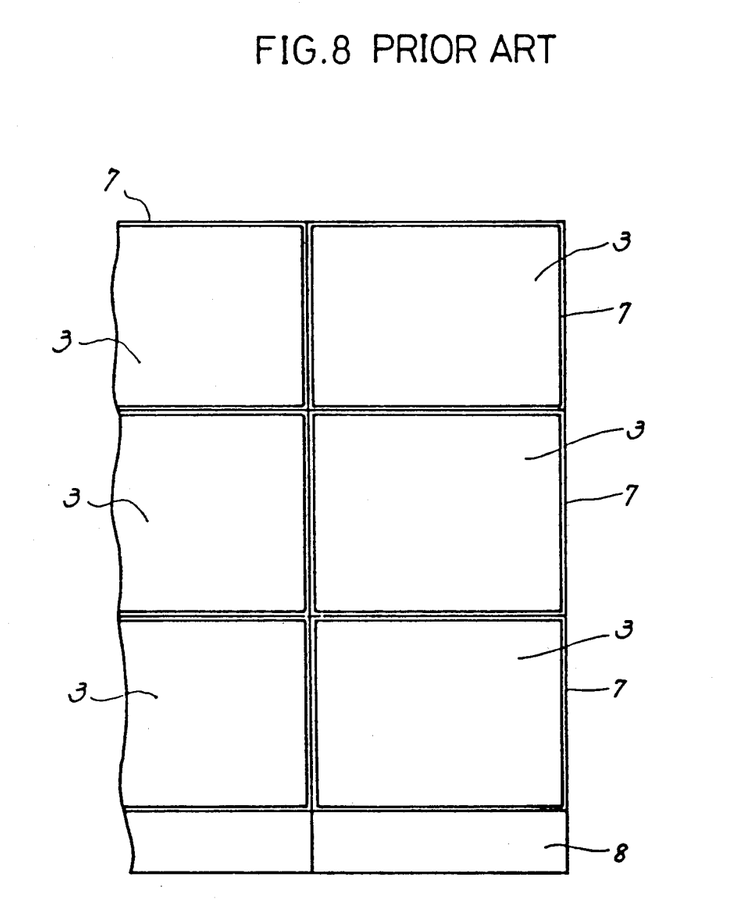
FIG. 8 is a fragmentary front view of a conventional multiscreen projector apparatus.
Figure 9:
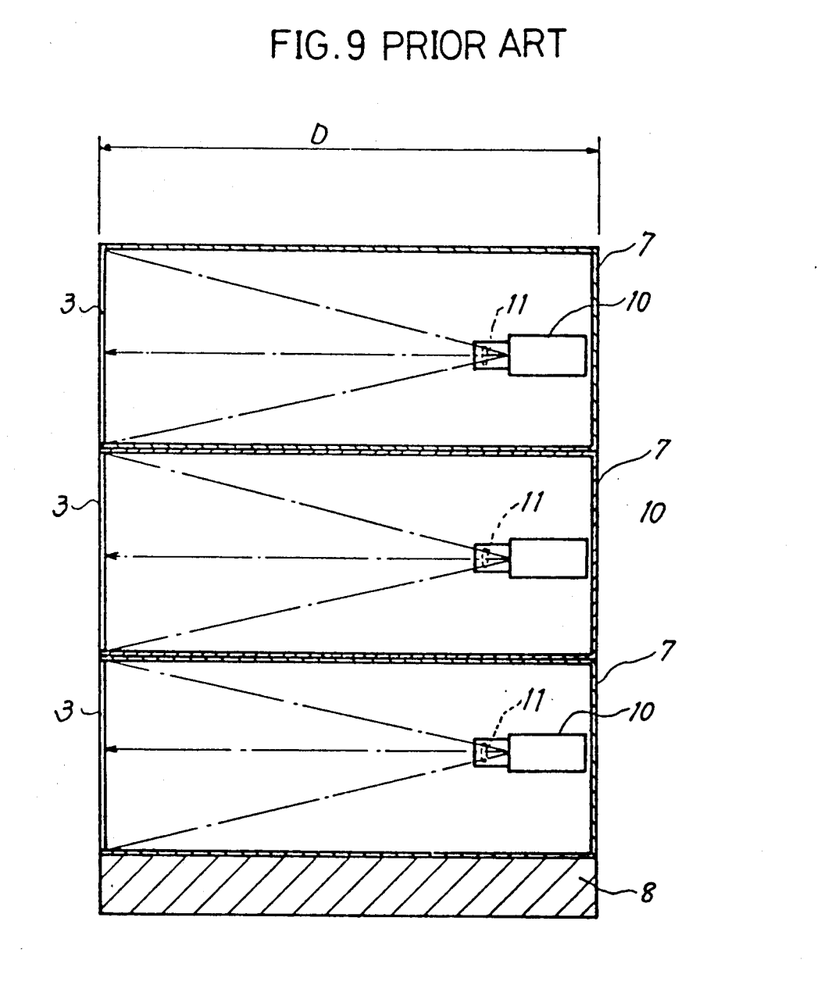
FIG. 9 is a view in vertical section of the projector apparatus.

A multiscreen projector apparatus is also known which comprises a plurality of liquid crystal projectors providing a large screen as seen in FIGS. 8 and 9.

The projector apparatus comprises a plurality of rectangular parallelepipedal cabinets 7 joined together as arranged vertically and laterally on a base 8 and each having a liquid crystal projector 10 accommodated therein. In front of the projector 10, a screen 3 comprising a lenticular lens of the transmission type is fixed to a front opening portion of the cabinet 7 for projecting images thereon.

The image is projected on the screen 3 by each liquid crystal projector 10 through a projection lens 11, and the images on the plurality of screens 3 are combined into a large continuous image.

The projector apparatus has the problem that when the projection lens 11 has a large focal length, the depthwise dimension D of the cabinet 7 increases with the focal length to make the apparatus large.

This problem will be overcome by using a wide-angle lens of short focal length, but the projector then has the drawback of insufficient quantity of light at the peripheral portion of the screen.

The depthwise dimension of the cabinet can be decreased alternatively by using a plurality of mirrors for reflecting the light from the projector unit as in the liquid display device disclosed in Unexamined Japanese Utility Model Publication HEI 1-115778.

The liquid crystal display device has a rectangular parallelepipedal cabinet the interior space of which is divided into upper and lower spaces. The upper space provides a projection chamber corresponding to a screen in vertical dimension, and the lower space provides a chamber accommodating a projector therein. Accordingly, the front side of the projector accommodating chamber is a non-screen area, and it is impossible to provide the screen over the entire area of the cabinet front side.

Consequently, in the case where such liquid crystal display devices are assembled into a multiscreen projector apparatus, the single image forming area to be provided by the screens is divided by the non-screen areas and can not be one continuous image forming area.

SUMMARY OF THE INVENTION

An object of the present invention is to provide a multiscreen projector apparatus comprising a cabinet wherein at least one reflecting mirror is disposed for reflexing an optical path extending from a projector to a screen to give a shortened depthwise dimension to the cabinet, the screen nevertheless being formed over the entire area of the front side of the cabinet.

The present invention provides a multiscreen projector apparatus which comprises a plurality of cabinets, each of the cabinets having a side wall intersecting a screen at a right angle therewith and formed with a projecting portion with a projector accommodated therein, and another side wall extending in parallel to the side wall as opposed thereto and formed with a recessed portion shaped in conformity with the shape of the projecting portion. One or a plurality of reflecting mirrors are arranged in an internal space between the projecting portion and the recessed portion for flexing an optical path extending from the projector within the projecting portion to the screen. The plurality of cabinets are assembled into the apparatus by engaging the projecting portion of each cabinet in the recessed portion of another cabinet adjacent thereto.

With the multiscreen projector apparatus described above, the projector is disposed close to the screen to shorten the depthwise dimension of the cabinet. Even in this case, the optical path from the projector to the screen, which is flexed by the reflecting mirrors, can be given a sufficient length, permitting the projector to project images on the screen at a specified enlargement ratio.

The recessed portion is formed in each cabinet utilizing a dead space off the flexed optical path and has engaged therein the projector accommodating projecting portion of another cabinet adjacent thereto. The screens of the plurality of cabinets assembled in this way are therefore joined together almost without creating any non-screen area between the screens to form a single continuous image projecting area.

The present invention also provides a multiscreen projector apparatus which comprises a plurality of cabinets, each of the cabinets being parallelogrammatic in vertical or horizontal section perpendicular to a screen and having a first side wall inclined at an obtuse angle with the screen, a second side wall extending in parallel to the first side wall and opposed thereto, and a projector disposed along the inner surface of the first side wall. One or a plurality of reflecting mirrors are arranged in an internal space between the first and second side walls for flexing an optical path extending from the projector to the screen. The plurality of cabinets are assembled by joining the first side wall of each cabinet to the second side wall of another cabinet adjacent thereto.

With the second projector apparatus described above, the projector is disposed close to the screen to shorten the depthwise dimension of the cabinet. Even in this case, the optical path from the projector to the screen can be given a sufficient length by being flexed by the reflecting mirrors, permitting the projector to project images on the screen at a specified enlargement ratio.

The first side wall and the second side wall of the projector apparatus correspond to the projecting portion and the recessed portion of the first projector apparatus, the second side wall is formed utilizing a dead space off the flexed optical path, and the first side wall of each cabinet is joined to the second side wall of another cabinet adjacent thereto. The screens of the plurality of cabinets assembled in this way are therefore joined together almost without creating any non-screen area therebetween to form a single continuous image projecting area.

DETAILED DESCRIPTION OF EMBODIMENTS

With reference to the drawings concerned, a description will be given of a first embodiment (FIGS. 1 to 4) and a second embodiment (FIGS. 5 to 7) of the invention, i.e., multiscreen projector apparatus.

First Embodiment

Figure 1:
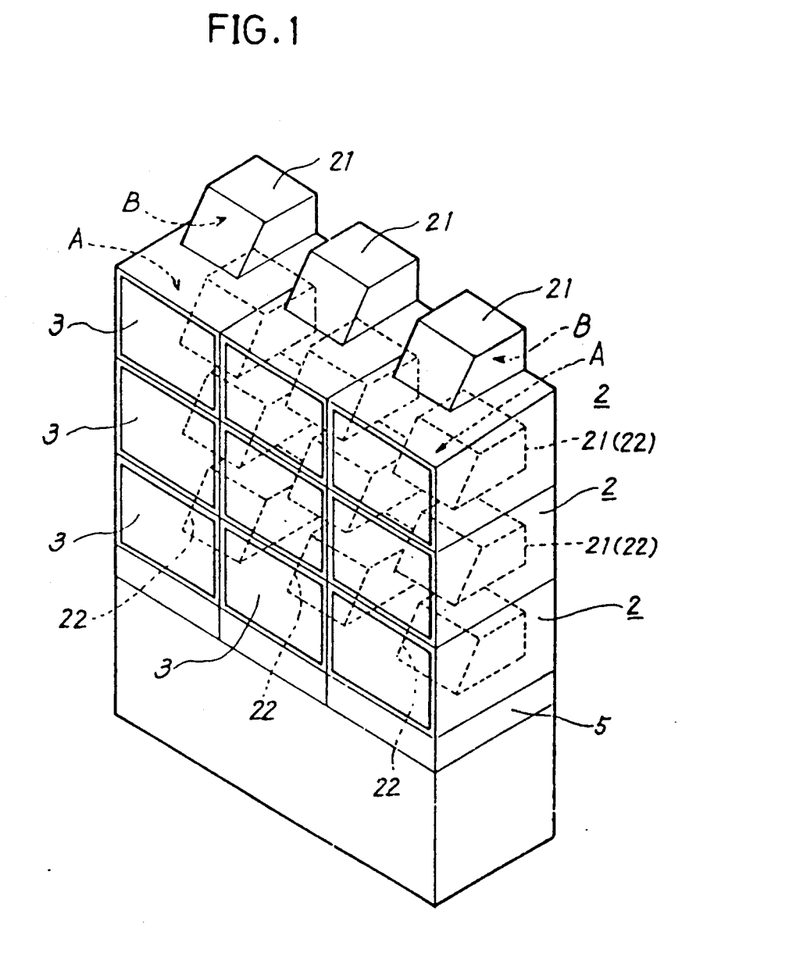
FIG. 1 is a perspective view of a multiscreen projector apparatus embodying the invention.
Figure 2:
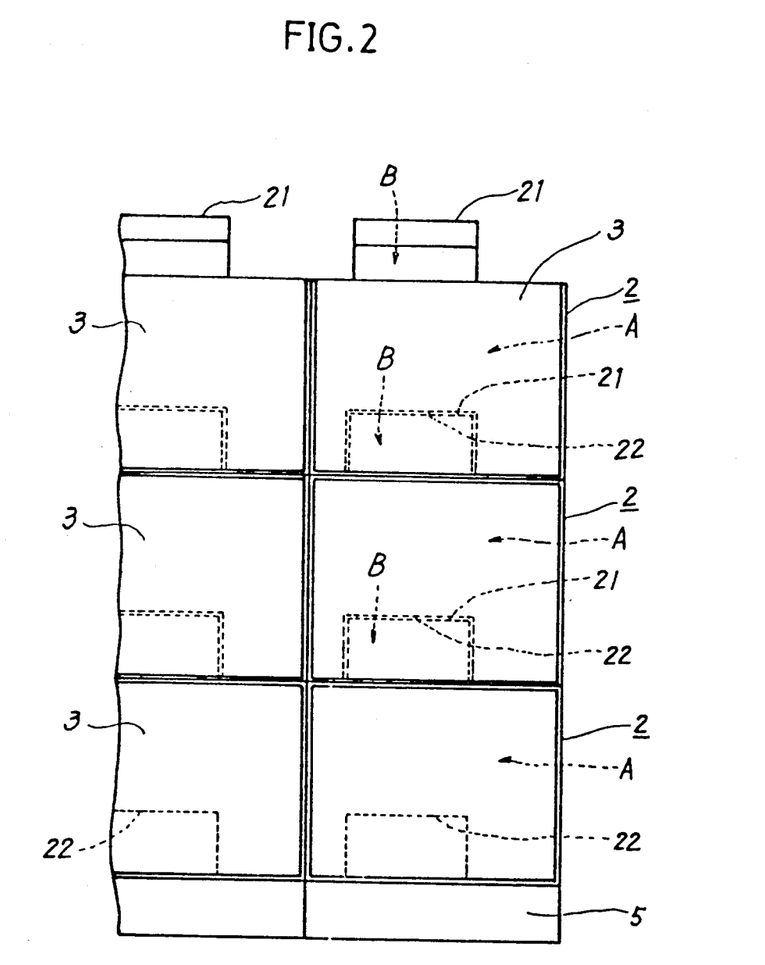
FIG. 2 is a fragmentary front view showing the projector apparatus.
Figure 3:
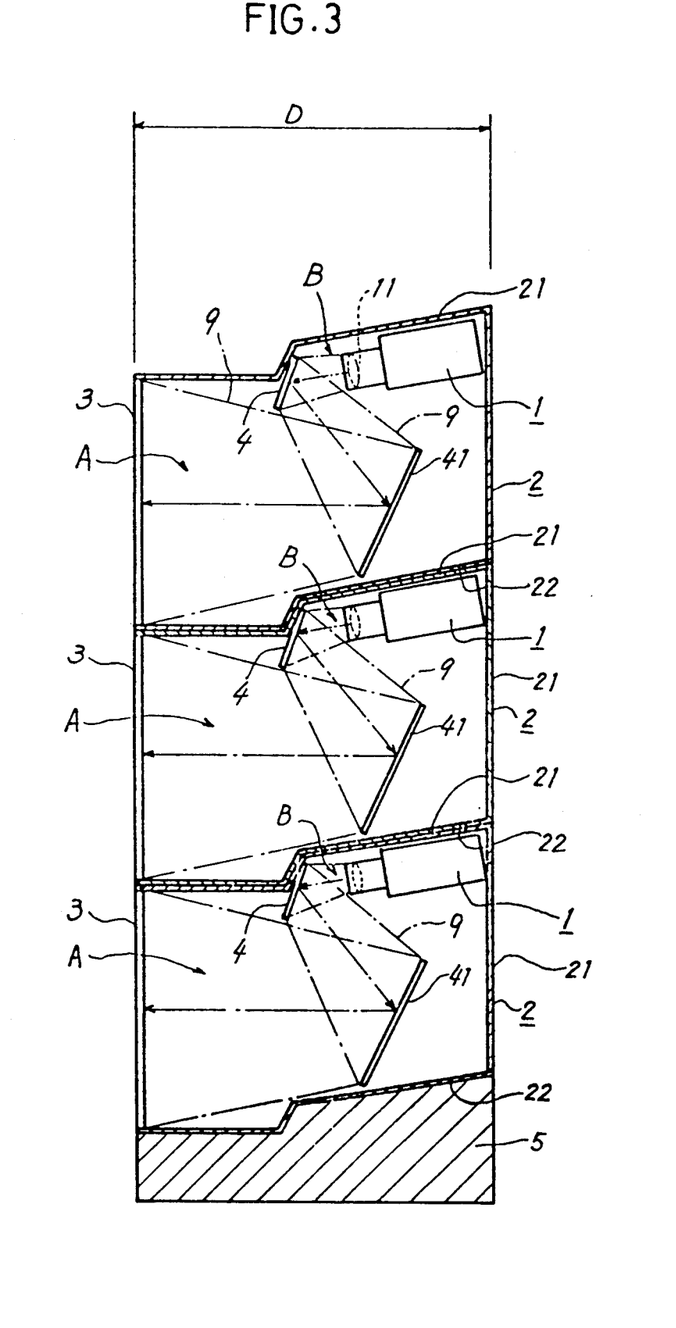
FIG. 3 is a view in vertical section of the projector apparatus.

Referring to FIGS. 1 to 3, cabinets 2 each having a lenticular screen 3 of the transmission type approximately over the entire area of the front side thereof are joined together as arranged on a base 5 vertically and laterally in three rows in each direction. The screens 3 of these nine cabinets 2 are joined together to form a single large image projecting area.

Figure 4:
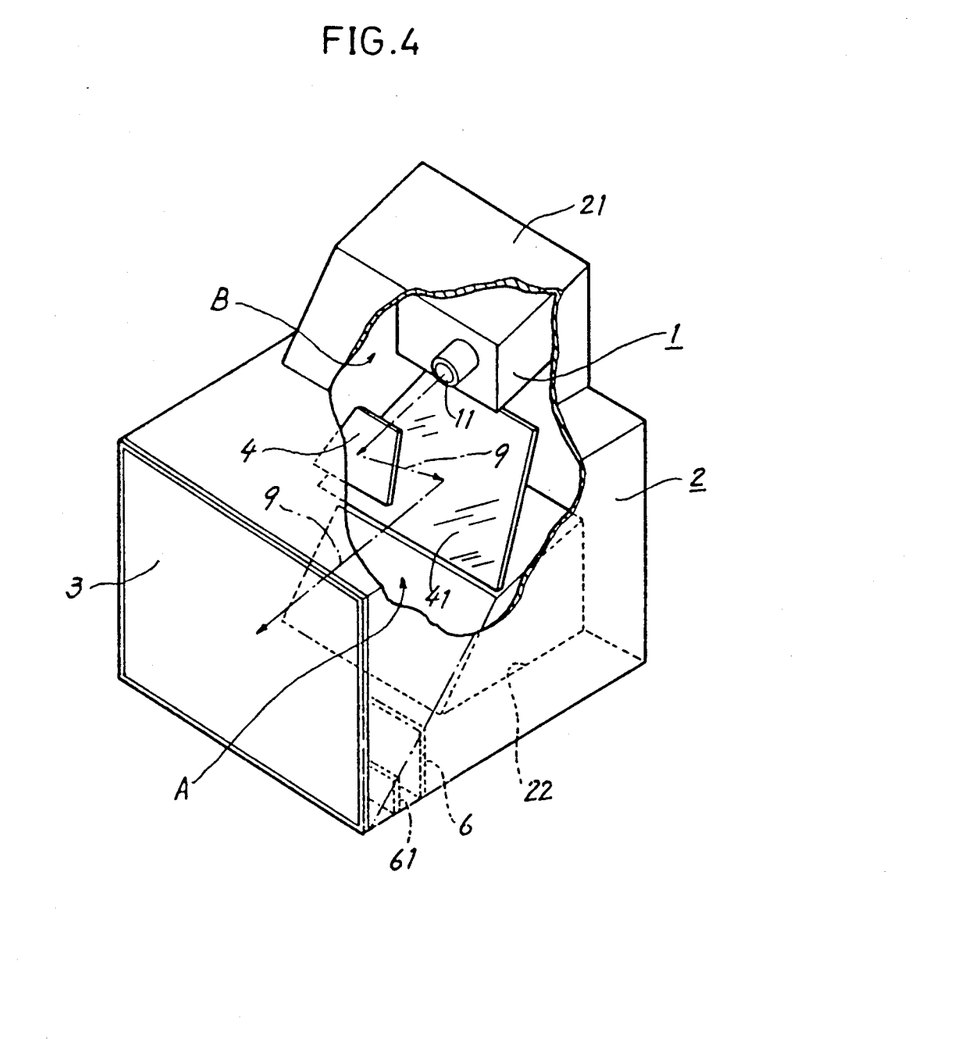
FIG. 4 is a perspective view partly broken away of a projector unit constituting the projector apparatus.

As shown in FIG. 4, the upper side wall of each cabinet 2 is formed with a projecting portion 21, the interior of which serves as a chamber B having accommodated therein a projector 1 comprising a liquid crystal projector. The lower side wall of the cabinet 2 is formed with a recessed portion 22 shaped in conformity with the shape of the projecting portion 21.

The interior of the cabinet 2 serves as a projection chamber A which has arranged therein a first reflecting mirror 4 positioned in front of the projection lens 11 of the projector 1, and a second reflecting mirror 41 positioned above the recessed portion 22 and opposed to the first reflecting mirror 4 and to the screen 3. An optical path 9 extending from the projector 1 to the screen 3 is flexed by these mirrors as indicated in dot-and-dash lines in the drawing and is thereby given a length sufficient to project images on the entire area of the screen.

The cabinet 2 is internally provided at its bottom with light-blocking plates 6, 61 arranged outside the optical path for blocking objectionable rays.

When these projector units are to be assembled into a multiscreen projector apparatus, the corresponding projecting portion 21 and recessed portion 21 of the two cabinets 2, 2 to be disposed one above the other are engaged with each other, whereby the opposed side walls are brought into intimate contact with each other as seen in FIG. 3.

The screens 3 of the cabinets 2 thus stacked up vertically are joined together almost without creating any non-screen area therebetween.

With the multiscreen projector apparatus, the optical path 9 is bent by the first and second reflecting mirrors 4, 41, so that the projector 1 can be disposed close to the screen 3. This shortens the depthwise dimension D of the cabinet 2.

Moreover, since the recessed portion 22 of each cabinet 2 is formed utilizing a dead space below the second reflecting mirror 41 and has engaged therein the projecting portion 21 of another cabinet 2 therebelow, the screens 3 of the three cabinets 2 stacked up vertically are joined together intimately, with the result that the nine screens 3 form a single continuous large image projecting area.

Second Embodiment

Figure 7:
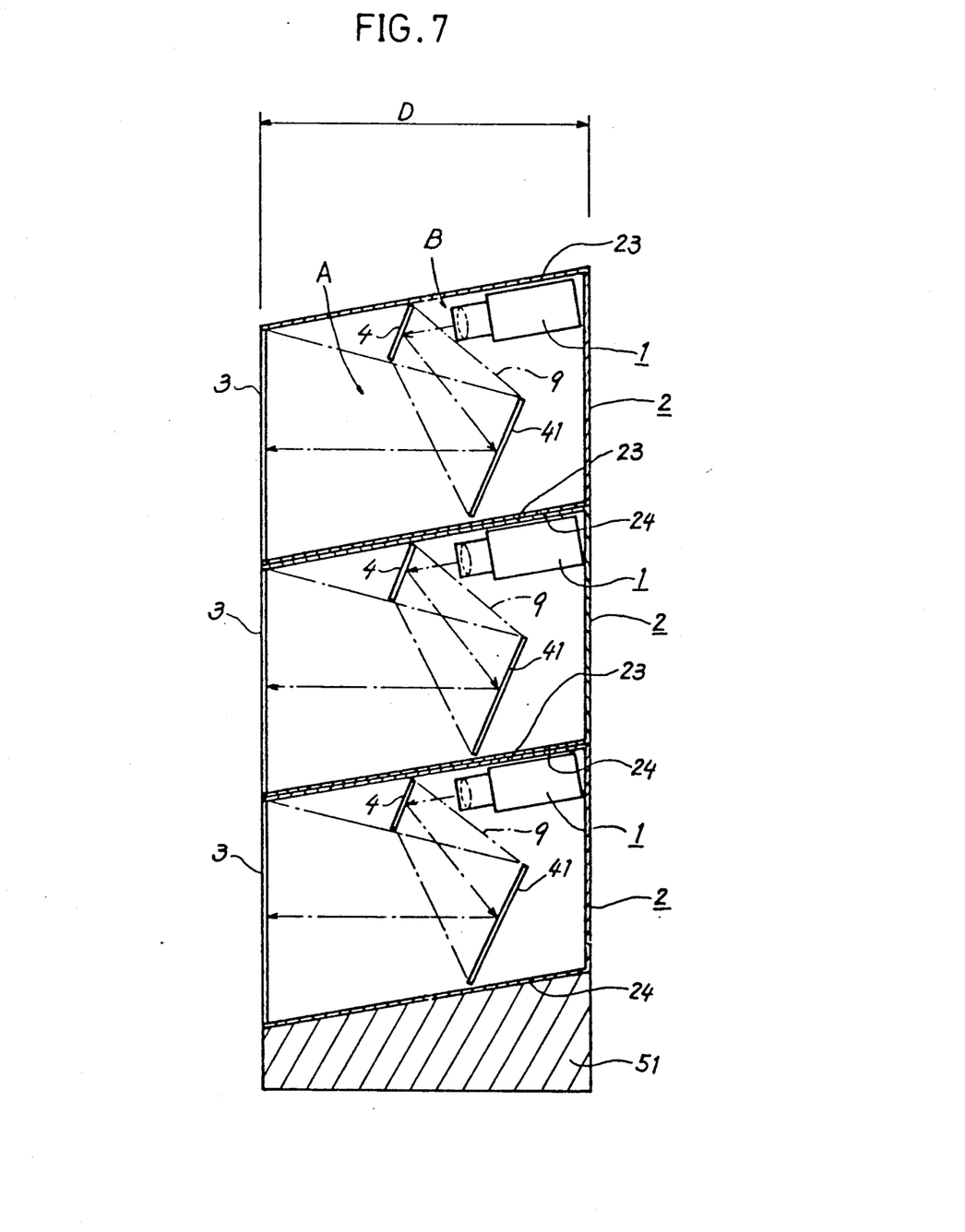
FIG. 7 is a view in vertical section of the projector apparatus.

With reference to FIG. 7, the second embodiment is the same as the first embodiment with respect to the arrangement of optical components within each projector unit, but differs therefrom in that the cabinet 2 is parallelogrammatic in section.

Figure 5:
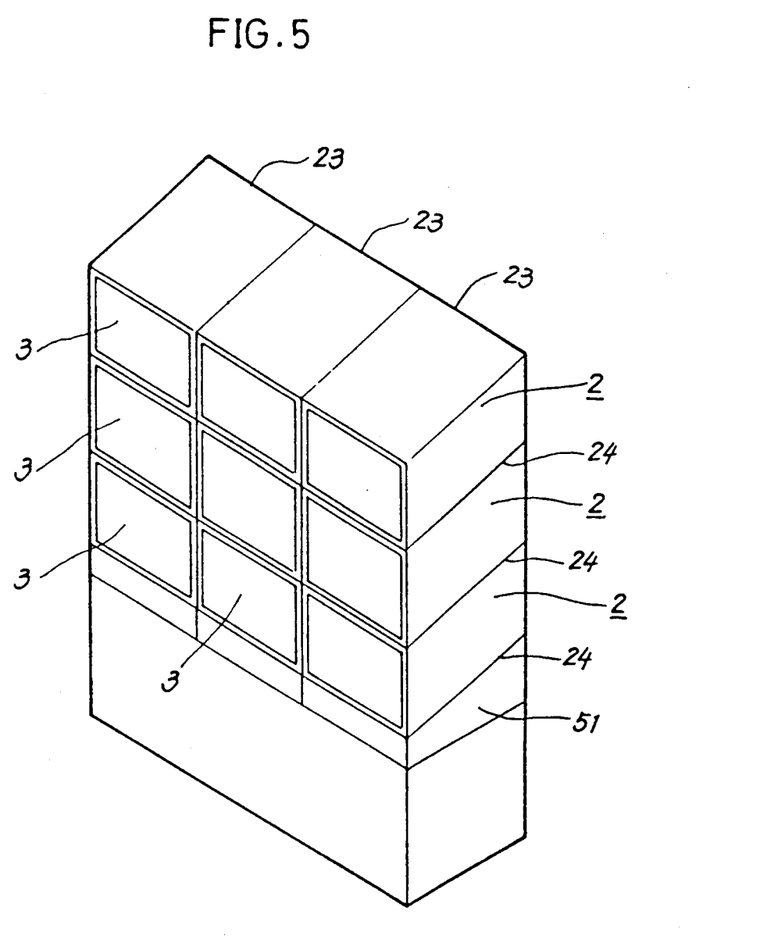
FIG. 5 is a perspective view of another multiscreen projector apparatus embodying the invention.
Figure 6:
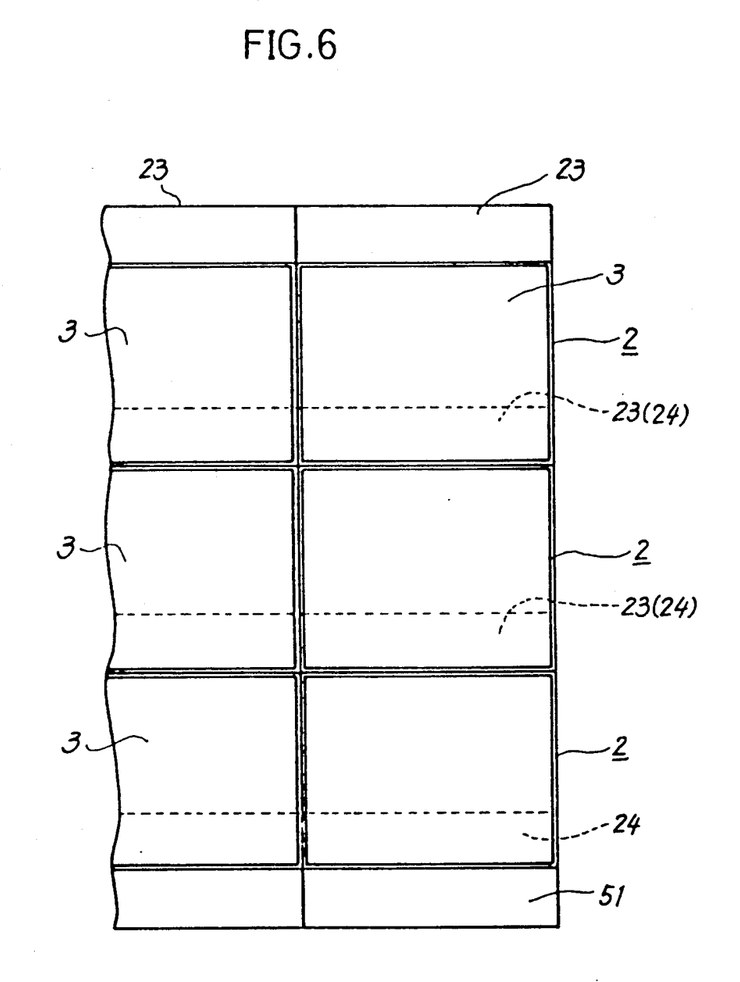
FIG. 6 is a fragmentary front view showing the projector apparatus.

As shown in FIGS. 5 to 7, cabinets 2 each having a lenticular screen 3 of the transmission type are joined together as arranged on a base 51 vertically and laterally in three rows in each direction. The nine screens 3 form a single large image projecting area.

Each cabinet 2 has a first side wall 23 on its upper side and a second side wall 24 on its lower side, and these side walls are inclined rearwardly upward at an angle of 10 to 20 degrees with respect to a horizontal plane. The angle of inclination is set to an optimum value in connection with the focal length of the projection lens 11 of the projector 1.

As seen in FIG. 7, a projector accommodating chamber B is provided in an inside space along the first side wall of the cabinet 2, and the cabinet 2 has inside thereof a projection chamber A having first and second reflecting mirrors 4, 41 arranged therein.

The projector units are assembled into a multiscreen projector apparatus in such manner that the first side wall 23 of one cabinet 2 and the second side wall 24 of another cabinet 2 to be positioned thereon are joined together.

The first side wall 23 and the second side wall 24 of the projector apparatus described correspond respectively to the projecting portion 21 and the recessed portion 22 of the projector apparatus of the first embodiment. Thus, the second side wall 24 of one cabinet 2 is formed utilizing a dead space provided below the second reflecting mirror 41 and has joined thereto the first side wall 23 of another cabinet 2 positioned therebelow.

Accordingly, the screens 3 of the three cabinets 2 stacked up vertically are joined together intimately, and the nine screens 3 form a single continuous large image projecting area.

As in the first embodiment, the optical path 9 is flexed by the first and second reflecting mirrors 4, 41 to shorten the depthwise dimension D of the cabinet 2.

The foregoing embodiments are given to illustrate the present invention and should not be interpreted as restricting the invention as defined in the appended claims or reducing the scope thereof. Further the construction of the present apparatus is not limited to those of the embodiments but can of course be modified variously by one skilled in the art without departing from the scope of the invention as defined in the claims.

What is claimed is:

1. A multiscreen projector apparatus comprising a plurality of cabinets joined together as arranged vertically and/or laterally, each of the cabinets having a screen of the transmission type on its front side and a projector accommodated therein for projecting images on the rear surface of the screen, each of the cabinets having a side wall intersecting the screen at substantially a right angle therewith and formed with a projecting portion accommodating the projector therein directing an optical path to the screen, another side wall extending in parallel to the side wall as opposed thereto and formed with a recessed portion shaped in conformity with the shape of the projecting portion, a first reflecting mirror arranged in front of the projector on a slant in an internal space between the projecting portion and the recessed portion, a second reflecting mirror arranged in backward of the first reflecting mirror on a slant for reflecting the optical path twice, said optical path extending from the projector within the projecting portion to the screen overlapping at the portion between the first and second mirrors, the plurality of cabinets being joined together in combination by engaging the projecting portion of each cabinet in the recessed portion of another cabinet immediately adjacent thereto.

2. A multiscreen projector apparatus comprising a plurality of cabinets joined together as arranged vertically and/or laterally, each of the cabinets having a screen of the transmission type on its front side and a projector accommodated therein for projecting images on the rear surface of the screen, each of the cabinets is parallelogrammatic in vertical or horizontal section perpendicular to the screen and has a first side wall inclined at an obtuse angle with the screen, a second side wall extending in parallel to the first side wall as opposed thereto, the projector being disposed along the inner surface of the first side wall directing an optical path to the screen, a first reflecting mirror arranged in front of the projector on a slant in an internal space between the first and second side walls, a second reflecting mirror arranged in backward of the first reflecting mirror on a slant for reflecting the optical path twice, said optical path extending from the projector to the screen overlapping at the portion between the first and second mirrors, the plurality of cabinets being assembled by joining the first side wall of each cabinet to the second side wall of another cabinet immediately adjacent thereto.

* * * * *